(12) United States Patent
Tong et al.

(10) Patent No.: US 8,148,670 B2
(45) Date of Patent: Apr. 3, 2012

(54) ROTARY ACTUATOR BALL-DETENT LOCKING MECHANISM

(75) Inventors: Jie Tong, Diamond Bar, CA (US); Sean Whitmarsh, Castaic, CA (US)

(73) Assignee: Woodward HRT, Inc., Santa Clarita, CA (US)

( * ) Notice: Subject to any disclaimer, the term of this patent is extended or adjusted under 35 U.S.C. 154(b) by 824 days.

(21) Appl. No.: 12/198,594

(22) Filed: Aug. 26, 2008
(Under 37 CFR 1.47)

(65) Prior Publication Data

US 2010/0050712 A1    Mar. 4, 2010

(51) Int. Cl.
*F42B 15/01* (2006.01)
(52) U.S. Cl. ........... 244/3.27; 244/3.24; 403/84; 403/91
(58) Field of Classification Search .................. 244/3.24, 244/3.25, 3.26, 3.27, 3.28, 3.29, 3.3; 403/84, 403/91, 92, 93, 21
See application file for complete search history.

(56) References Cited

U.S. PATENT DOCUMENTS

| | | | | |
|---|---|---|---|---|
| 3,174,599 A | * | 3/1965 | Spyridakis et al. | ......... 192/56.53 |
| 3,477,333 A | * | 11/1969 | Yamamoto et al. | ............ 411/348 |
| 4,143,838 A | | 3/1979 | Holladay | |
| 4,296,895 A | | 10/1981 | Pazmany | |
| 4,404,714 A | | 9/1983 | Duran | |
| 4,795,110 A | | 1/1989 | Lang | |
| 5,007,762 A | | 4/1991 | Duran | |
| 5,607,250 A | | 3/1997 | Tatterson et al. | |
| 5,658,087 A | * | 8/1997 | Butkovich et al. | ......... 403/359.5 |
| 6,152,645 A | | 11/2000 | Sanford | |
| 6,186,443 B1 | | 2/2001 | Shaffer | |
| 6,206,432 B1 | | 3/2001 | Kamiyama | |
| 6,224,013 B1 | * | 5/2001 | Chisolm | ...................... 244/3.27 |
| 6,299,101 B1 | | 10/2001 | Schroppel et al. | |
| 6,928,931 B1 | | 8/2005 | Biserød | |
| 6,948,685 B2 | | 9/2005 | Hawthorne | |
| 7,125,058 B2 | | 10/2006 | Hawthorne | |
| 7,207,518 B2 | * | 4/2007 | Alculumbre et al. | ........ 244/3.29 |
| 7,316,370 B2 | | 1/2008 | Sankovic et al. | |
| 7,762,739 B2 | * | 7/2010 | Blanchard | ................... 403/322.2 |
| 2006/0278754 A1 | | 12/2006 | Sankovic et al. | |

FOREIGN PATENT DOCUMENTS

| | | |
|---|---|---|
| DE | 2418915 A1 | 10/1975 |
| EP | 0441669 A | 8/1991 |
| EP | 1191271 A | 3/2002 |

OTHER PUBLICATIONS

International Search Report and Written Opinion for PCT/US2009/054879, mailed Dec. 9, 2009.

* cited by examiner

*Primary Examiner* — Benjamin P Lee
(74) *Attorney, Agent, or Firm* — BainwoodHuang

(57) ABSTRACT

One embodiment is directed to a locking mechanism. The locking mechanism has a housing and a rotary actuator carried by the housing. The rotary actuator includes a shaft and armature disposed around at least a portion of the shaft. The armature is configured to rotate the shaft about a longitudinal axis of the shaft. The locking mechanism also has a cam carried by the shaft and a set of locking balls disposed between the cam and the housing. The locking mechanism has a locking assembly carried by the housing, the locking assembly being axially positionable between a locked position relative to the housing and a released position relative to the housing.

15 Claims, 6 Drawing Sheets

ROTARY ACTUATOR BALL-DETENT LOCKING MECHANISM

BACKGROUND

In certain environments, such as in flight vehicles and projectiles, certain structural members, such as fins, are required to be held in a secured, retracted position for storage, transportation, or other pre-deployment requirements and are required to be quickly and reliably released during operation. Locking mechanisms are typically used to provide such securing and release of the structural members. For example, in certain applications such as smart bombs with movable fins (for guidance), missiles with movable fins, and satellite or space vehicles and equipment with deployable panels (e.g., solar panels), a locking mechanism biases the fins or panels towards their retracted positions with a large force, typically a spring force. Actuation of the locking mechanism causes the fins or panels to be released to a deployed position.

One type of locking mechanism, such as a ball-detent locking mechanism, includes a housing having a plunger spring compressed into a locked position. In the locked position, a portion of the plunger holds one or more balls in a position where they lock a further element (e.g., moveable fins or structural members) in a locked position. For example, when in the locked position, the plunger holding the balls has a recess or recesses proximate to but not in alignment with one or more balls. As the plunger moves axially to the release position, the recess or recesses of the plunger align with and receive the balls, allowing the balls to move from the housing detents, and thereby allow expansion of the spring to an open position to release the lock on the element being held. The plunger's linear motion can be either manually driven or electrically driven such as by use of a solenoid.

SUMMARY

Unfortunately there are deficiencies to the above-described conventional ball-detent locking mechanism. For example, typical ball-detent locking mechanisms use linear movement to align the recessing feature on the plunger with the balls and allow balls to retreat into the recessing feature and release the element being held. In an automatically controlled ball-detent locking mechanism, the linear motion of the plunger is provided by a linear actuator. When the actuator is activated, the actuator shaft moves linearly in one direction, and when it is de-activated, the actuator shaft is driven in the opposite direction by a spring. To reduce the overall weight and volume of the locking mechanisms, typical ball-detent locking mechanisms include a relatively low-powered solenoid to actuate the plunger. Accordingly, the locking mechanisms include springs having a relatively small biasing force (e.g., less than about 100 pounds) to accommodate the linear actuating force provided by the low-powered solenoid. Restriction to low force springs limits the number of suitable applications for the typical ball-detent locking mechanism.

Another deficiency to the above-described conventional ball-detent locking mechanism relates to the potential for unintended release of typical ball-detent locking mechanisms as caused by interference from external forces. Flight vehicles and projectiles are subjected to significant external forces in the form of shocks or vibrations during handling and launching. For example a bomb carried on a plane would be subject to forces resulting from the acceleration of the plane during take off. Such shocks and vibrations applied along the longitudinal axis of a ball-detent locking mechanism's plunger can potentially interfere with the operation of the linear actuator. For example, since the locking mechanism must only be unlocked when it is commanded to do so, the potential for an unintended release caused by interference from external forces applied to the plunger during vehicle handling and launching creates a reliability concern.

In contrast to the above described linear actuation ball-detent locking mechanism, a locking mechanism includes a rotary actuator used to release a locking assembly. The rotary actuator acts as a force magnification mechanism in that only a small amount of force is necessary to rotate the actuator and release a spring that delivers a relatively much larger force to deploy various components of an arborne device. Because the motion of the rotary actuator is perpendicular to the external forces applied to the components of the arborne device, the risk of outside interference and accidental deployment is reduced. Additionally, since only a small amount of force is necessary to rotate the actuator, a small, lightweight rotary actuator can be used even for circumstances that require large spring forces. A small, lightweight rotary actuator reduces the overall weight that is added to a flight vehicle which can conserve fuel, reduce the cost of the part, lower power consumption, and provide a smaller envelope.

One rotary actuator embodiment is directed to a locking mechanism. The locking mechanism has a housing and a rotary actuator carried by the housing. The rotary actuator includes a shaft and armature disposed around at least a portion of the shaft. The armature is configured to rotate the shaft about the longitudinal axis of the shaft. The locking mechanism also has a cam fastened to the shaft and a set of locking balls disposed between the cam and the housing. The locking mechanism has a locking assembly carried by the housing, the locking assembly being axially positionable between a locked position relative to the housing and a released position relative to the housing. The rotary actuator is configured to rotate the cam between (i) a first position to maintain the set of balls in a locked state relative to the housing and the cam and to maintain the locking assembly in the locked position and (ii) a second position to position the set of balls to a released state relative to the housing and the cam and to position the locking assembly to the released position.

One embodiment is directed to an arborne device. The arborne device has an arborne device chassis and a member moveable between a retracted position and a deployed position. The arborne device has a locking mechanism connected to the member and configured to position the member from the retracted position to the deployed position. The locking mechanism has a housing connected to the arborne device chassis and a rotary actuator carried by the housing. The rotary actuator includes a shaft and armature disposed around at least a portion of the shaft. The armature is configured to rotate the shaft about a longitudinal axis of the shaft. The locking mechanism also has a cam carried by the shaft and a set of locking balls disposed between the cam and the housing. The locking mechanism has a locking assembly carried by the housing, the locking assembly being axially positionable between a locked position relative to the housing and a released position relative to the housing. The rotary actuator is configured to rotate the cam between (i) a first position to maintain the set of balls in a locked state relative to the housing and the cam, to maintain the locking assembly in the locked position, and to maintain the member in the retracted position and (ii) a second position to position the set of balls to a released state relative to the housing and the cam, to position the locking assembly to the released position, and to position the member to the deployed position.

One embodiment is directed to a method for deploying a moveable member of an airborne device. The method includes inserting a locking mechanism into an airborne device, the locking mechanism having a housing, a rotary actuator, a cam carried by the shaft, a set of balls disposed between the cam and the housing, and a locking assembly carried by the housing. The method includes rotating the cam between (i) a first position to maintain the set of balls in a locked state relative to the housing and the cam and to maintain the locking assembly in a locked position and (ii) a second position to position the set of balls to a released state relative to the housing and the cam and to position the locking assembly to a released position. The method includes actuating the locking assembly from the locked position to the released position. The method includes releasing the moveable member from a retracted position to a deployed position when the locking assembly is in the released position.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

A locking mechanism includes a rotary actuator used to release a ball-detent locking mechanism. The rotary actuator acts as a force magnification device in that only a small amount of force, such as between about 1 and 3 pounds force, is necessary to rotate the actuator and release a spring that delivers a relatively much larger force, such as between about 100 and 150 pounds force, to deploy various components such as those in airborne devices. The rotary actuator also reduces the risk of accidental deployment as caused by external forces since these forces tend to be perpendicular to the rotary actuator's range of motion.

Figure 1:
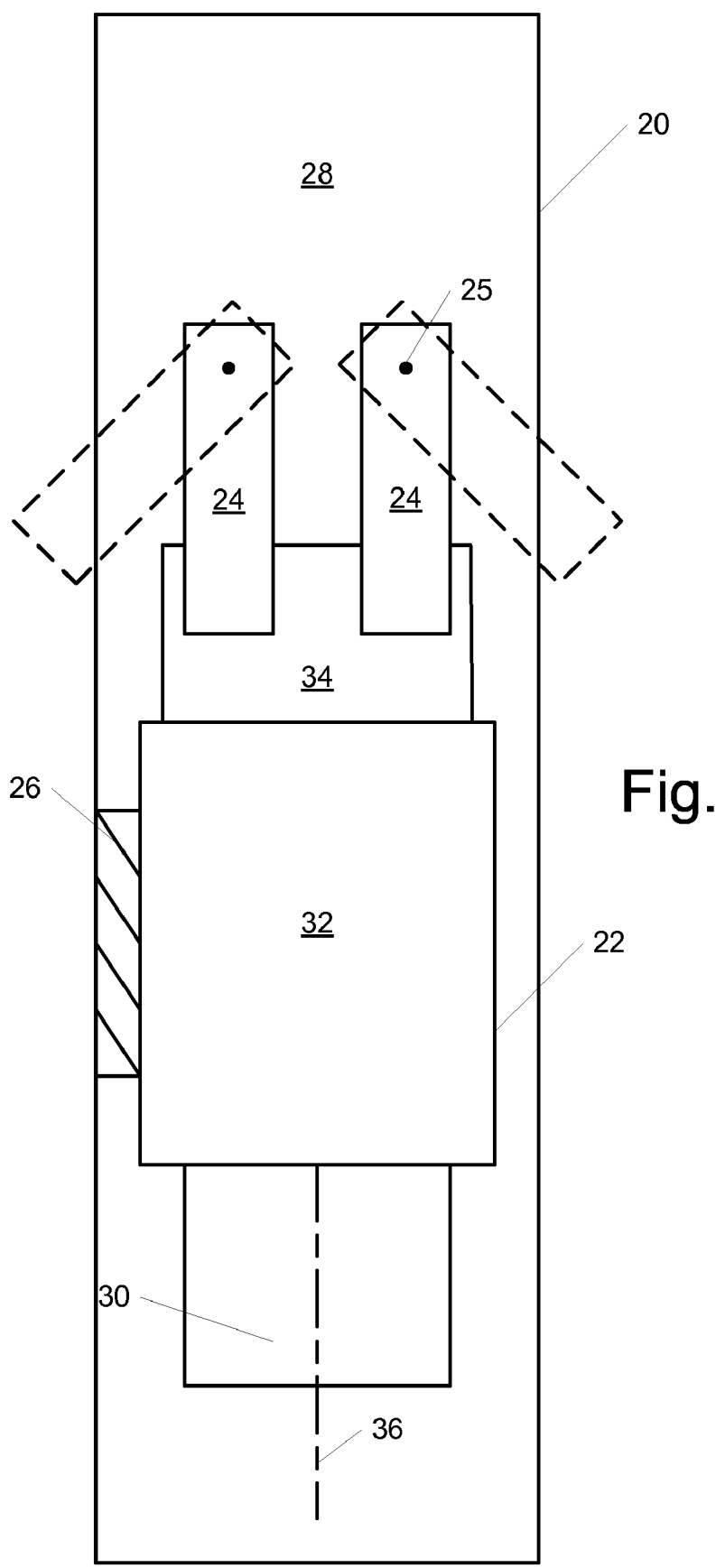
FIG. 1 is a schematic representation of an airborne device having a locking mechanism.

FIG. 1 shows an airborne device 20 such as a bomb, missile, or torpedo which includes a set of members 24, such as spring-loaded fins, and a locking mechanism 22. The locking mechanism 22 is configured to interact with the members 24 to hold the members 24 in a retracted position and to allow the members 24 to release to a deployed position, the deployed positioning of the members 24 shown in dotted line. In one arrangement, the locking mechanism 22 interacts directly with the members 24.

The locking mechanism 22 has a housing 32, a rotary actuator 30, and a locking assembly 34. As seen in FIG. 1, in one arrangement, the housing 32 is rigidly attached to a rigid surface, such as the airborne device's chassis 28 at a mating region 26. The rotary actuator 30 is configured to actuate components inside the housing 32 to position the locking assembly 34 in either the locked position or the released position. For example, portions of the rotary actuator 30 rotate about an axis of rotation 36 to position the locking assembly 34 between a first position to hold the members 24 in a retracted position and a second position to release the members 24 to a deployed position.

For example, in use, when the locking mechanism 22 is disposed in a first position, the rotary actuator 30 maintains the locking assembly 34 in the locked position which, in turn, retains the members 24 in a non-deployed configuration. When the locking mechanism 22 is disposed in a second position, rotary actuator 30 actuates the locking assembly 34 to the released position, which, in turn, allows the spring-loaded members 24 to rotate relative to pivot points 25 and become deployed. As will be discussed in further detail below, with regards to FIG. 2 through FIG. 5, incorporation of the rotary actuator 30 into the locking mechanism 22 provides force magnification for the airborne device 20 such that a relatively small input force provides a relatively large output force.

Figure 2:
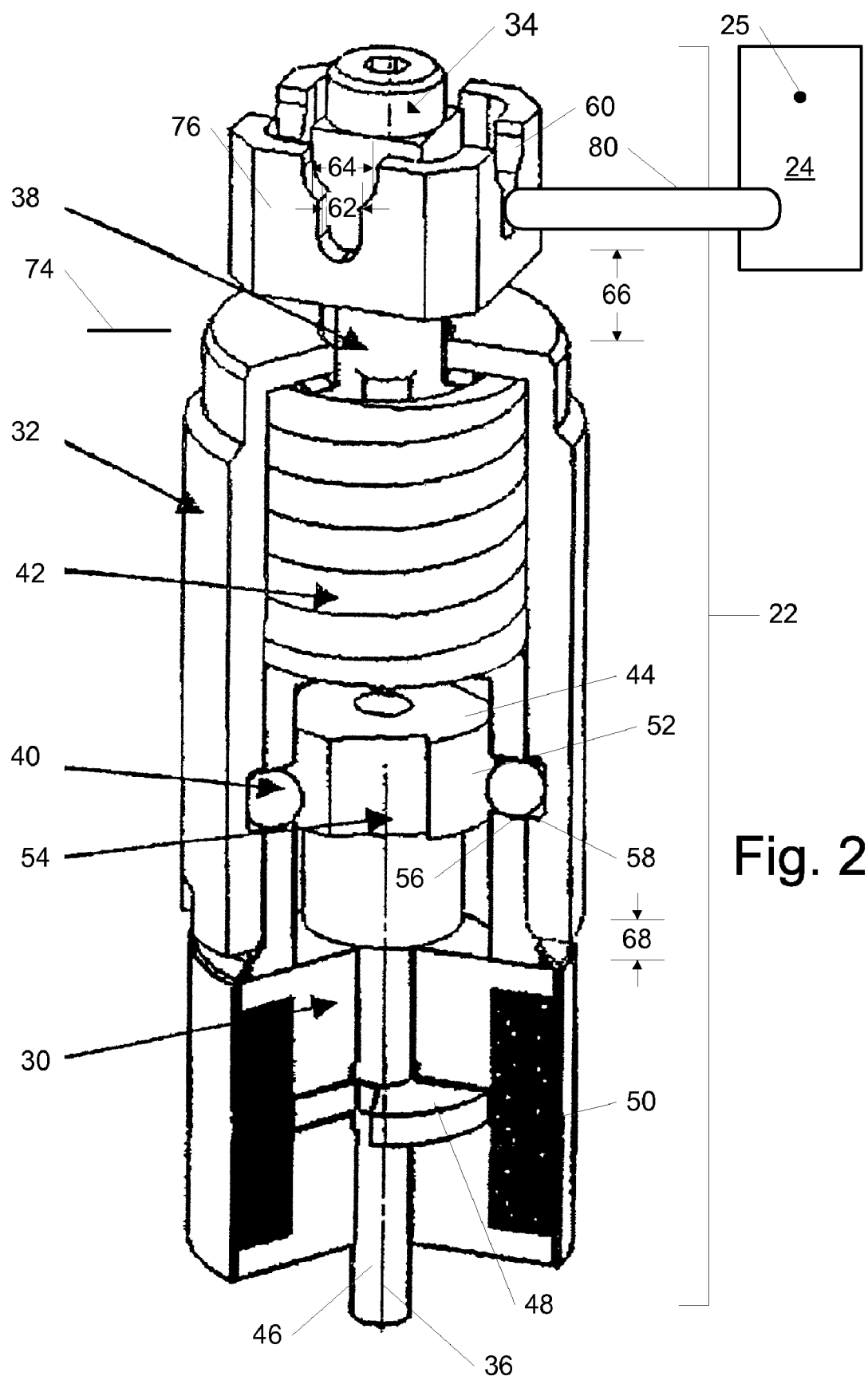
FIG. 2 is an isometric, sectional view of the locking mechanism of FIG. 1 in a locked position.
Figure 3:
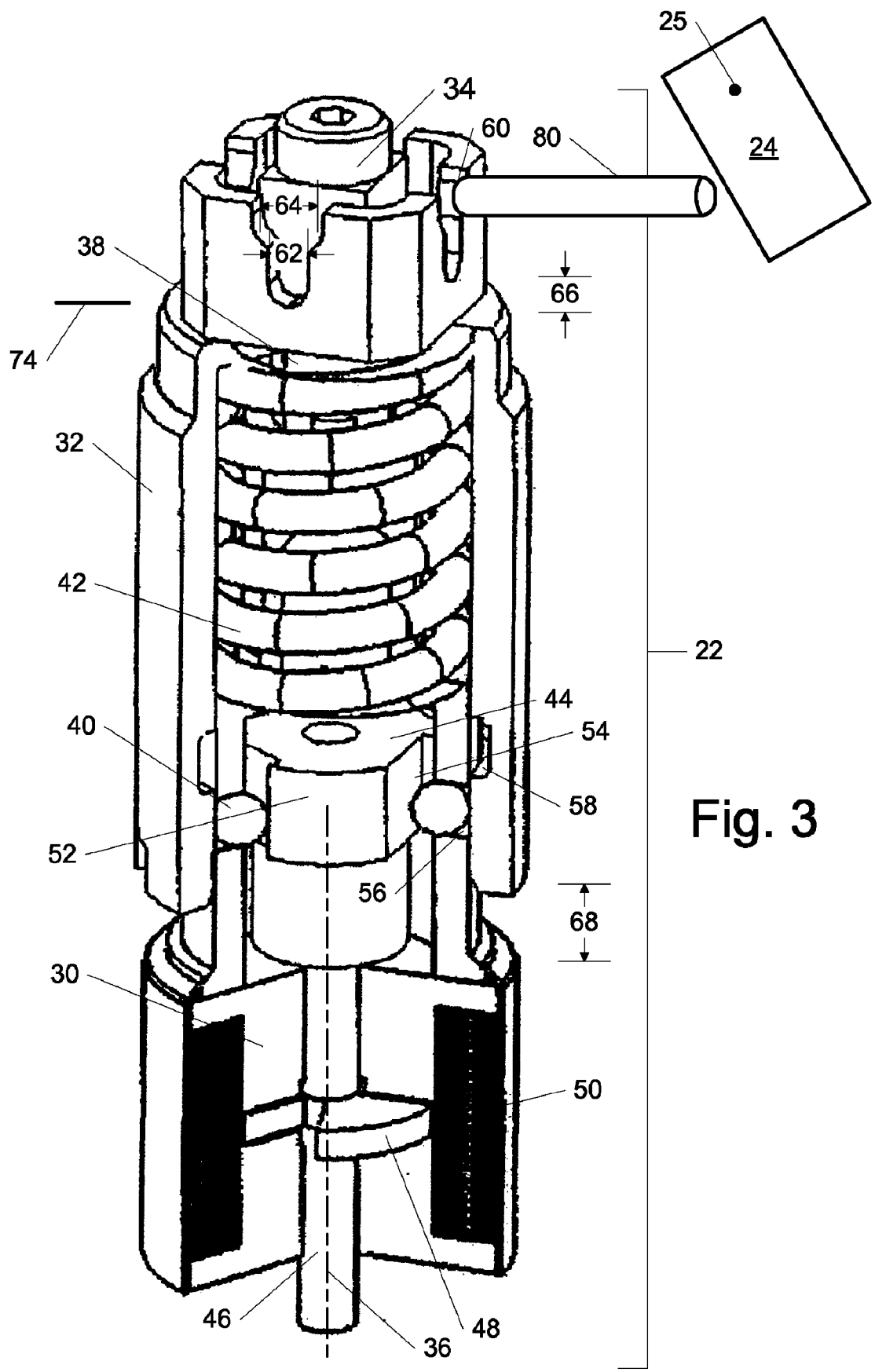
FIG. 3 is an isometric, sectional view of the locking mechanism of FIG. 1 in a released position.
Figure 4:
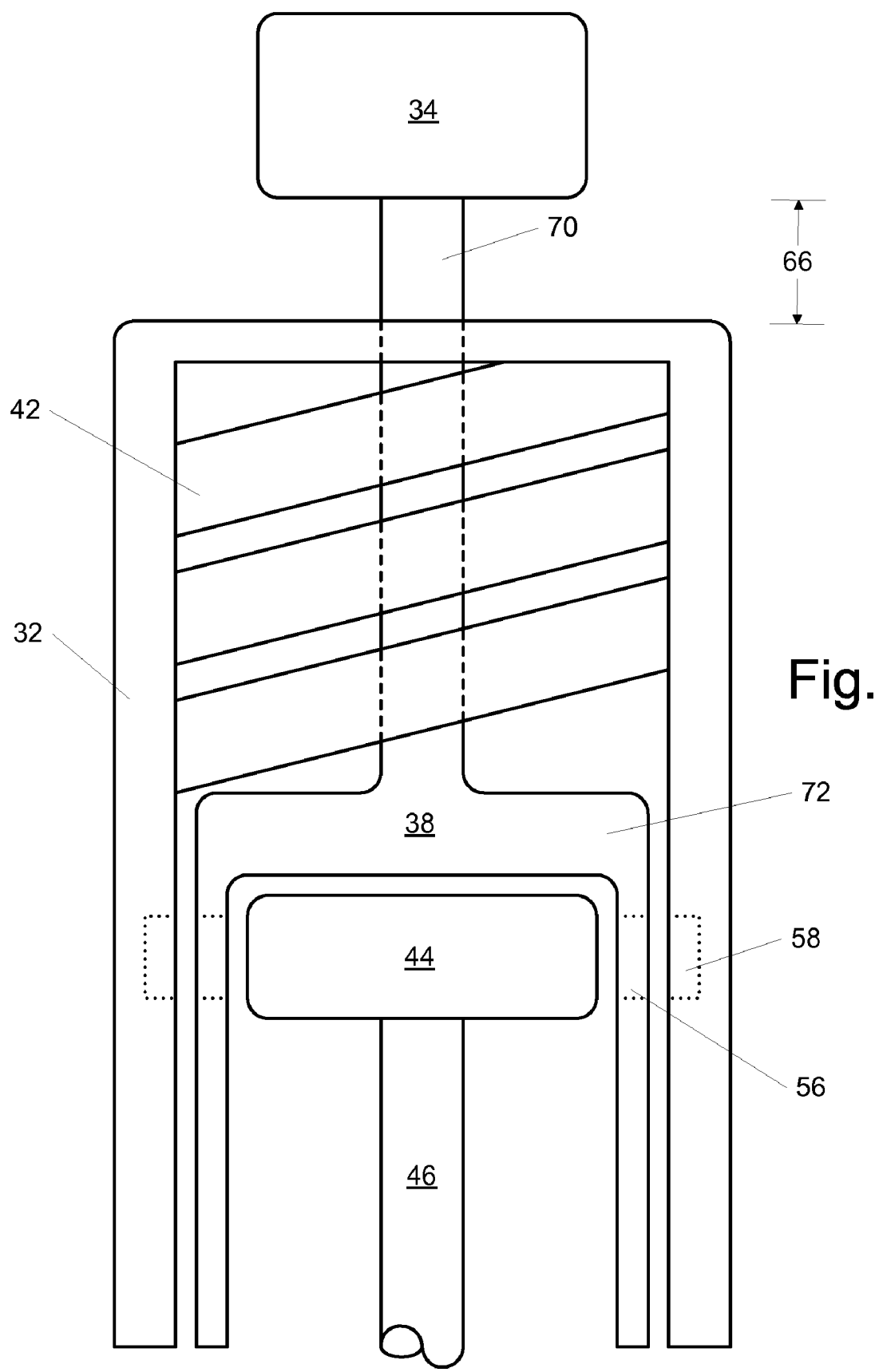
FIG. 4 is a schematic representation of a side, sectional view of the locking mechanism of FIG. 1 in the locked position.
Figure 5:
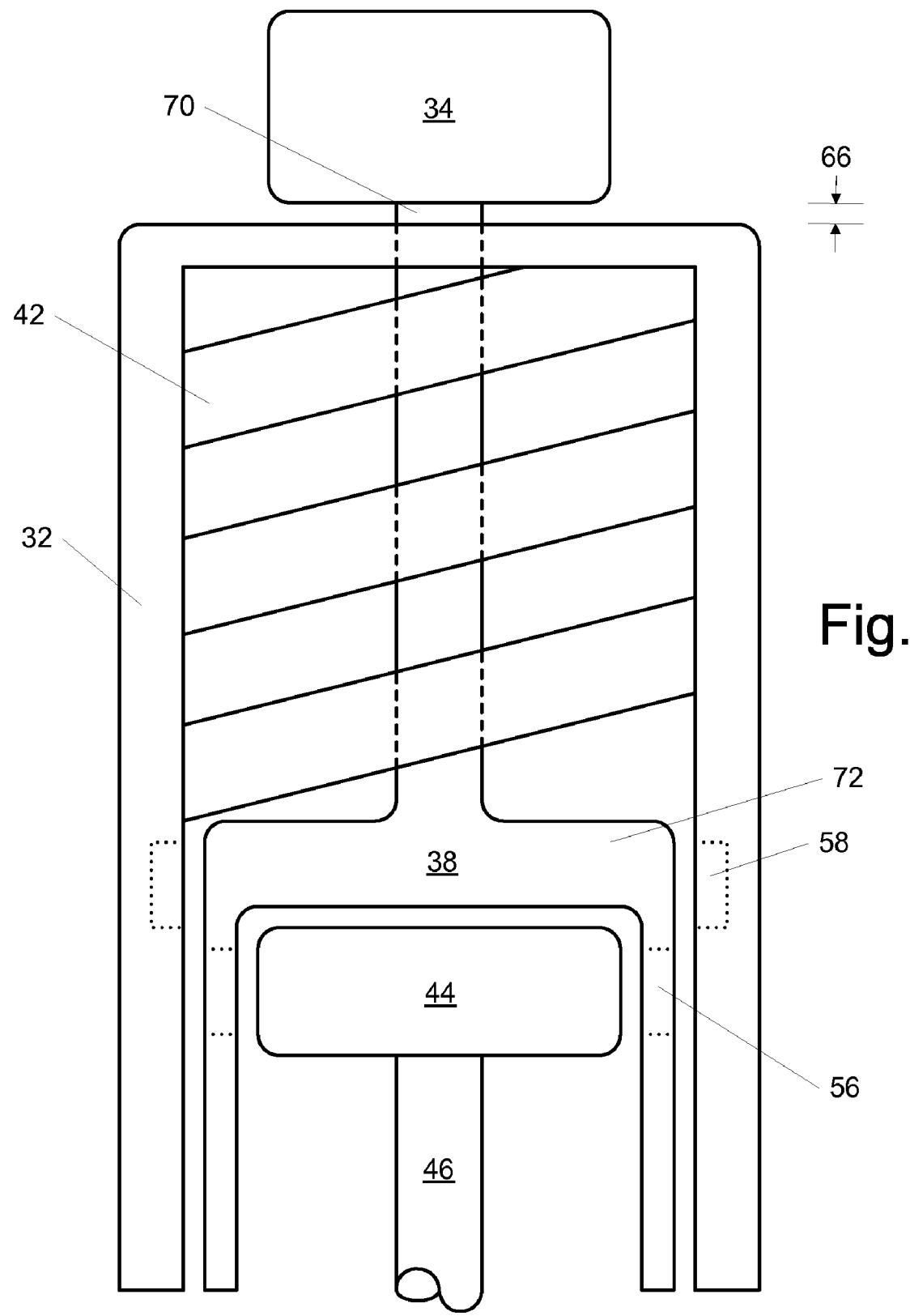
FIG. 5 is a schematic representation of a side, sectional view of the locking mechanism of FIG. 1 in the released position.

FIG. 2 through FIG. 5 illustrate an arrangement of the locking mechanism 22 in both a locked position (FIG. 2 and FIG. 4) and a released position (FIG. 3 and FIG. 5). As illustrated, the locking mechanism 22 includes the rotary actuator 30, the housing 32, the locking assembly 34, a lock shaft 38, a set of balls 40, a biasing member 42, such as a spring configured to generate about 100 pounds of force or more, and a cam 44.

The rotary actuator 30 has an actuator shaft 46, actuator armature 48, and a set of permanent magnets 50. The actuator armature 48 is attached axially to the actuator shaft 46. The actuator armature 48 is formed as a set of wire windings disposed about the actuator shaft 46. The set of permanent magnets 50 surround the actuator shaft 46 and the actuator armature 48. When the rotary actuator 30 receives a signal, such as a current passed through the actuator armature 48 wires in a certain direction, the actuator armature 48 becomes magnetized and aligns with the opposite poles on the set of permanent magnets 50 that surround the actuator armature 48. Since the actuator armature 48 is attached to the actuator shaft 46, the actuator shaft 46 rotates along the axis of rotation 36 when the actuator armature 48 aligns with the set of permanent magnets 50.

The force required rotate the actuator shaft 46 is relatively low when compared to conventional linear actuators or solenoids that are used for similar functions in other locking mechanisms. The rotary actuator 30, unlike a linearly actuated solenoid, applies a rotary force to the actuator shaft 46 that is perpendicular to other forces within the locking mechanism 22 (such as a compressed spring force which is discussed below). Thus it is unnecessary for the rotary actuator 30 to generate a force on the actuator shaft 46 to oppose these perpendicular forces within the locking mechanism 22.

The cam 44 is attached to, and rotates with, the actuator shaft 46. The cam 44 has a set of lobes 52 and defines a set of voids 54. When the cam 44 is in the first position, as seen in FIG. 2, the set of lobes 52 is configured to press against the set of balls 40. The lobes 52 in this position are configured to restrain the balls 40 in place to keep the locking mechanism 22 in the locked position. When the rotary actuator 30 rotates the cam 44 into the second position, as seen in FIG. 3, the set of lobes 52 are no longer in contact with the set of balls 40. When the cam 44 is in the second position, the set of voids 54 are configured to align with the set of balls 40, allowing the balls 40 to fall into the voids 54. When the balls 40 fall into the voids 54, the locking mechanism 22 is configured to position into the released position by the expansion of the compressed spring 42. The interaction of the cam 44 with the balls 40 allows the rotational motion of the rotary actuator 30 to produce a linear motion of the locking assembly 34.

As seen in FIG. 4 and FIG. 5, the lock shaft 38 surrounds the cam 44 and extends toward the locking assembly 34. The lock shaft 38 defines a set of lock shaft grooves 56. The housing 32 surrounds the cam 44 and the lock shaft 38 and defines a set of housing grooves 58. The biasing member 42 is disposed between the housing 32 and the lock shaft 38. A connecting member 70 attaches directly to the locking assembly 34 above the housing 32. The connecting member 70 passes through the top of the housing 32. In the housing 32, the lock shaft 38 includes a set of flanges 72 that surrounds the cam 44.

As indicated above, during operation of the locking mechanism 22, the locking assembly 34 moves between a locked position and a deployed position relative to the members 24 of an airborne device 20. The following provides a description of the locking assembly 22 in use.

As seen in FIGS. 2 and 4, in the locked position, the biasing member 42 is compressed such that the housing grooves 58 and the lock shaft grooves 56 are aligned. The set of balls 40 are disposed in an area created by the aligned housing grooves 58 and lock shaft grooves 56. The lobes 52 of the cam 44, when in the first position, limits movement of the balls 40 thus restraining the balls 40 to the area created by the aligned housing grooves 58 and lock shaft grooves 56. The compressed spring 42 applies a force on the flanges 72 of the lock shaft 38, but the interaction between the balls 40 prevents any movement of the lock shaft 38.

Figure 6:
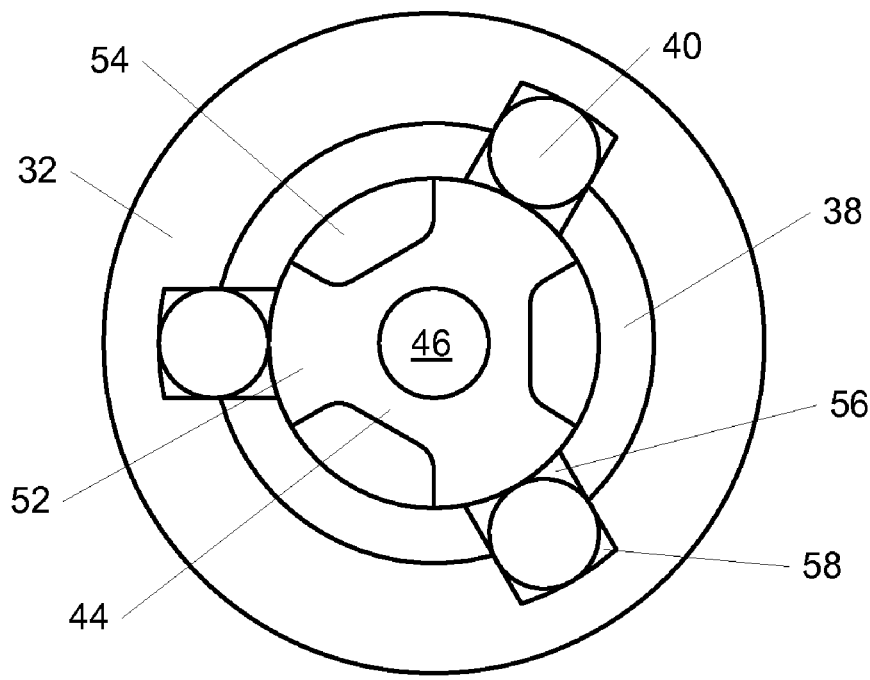
FIG. 6 is top cross-sectional view of the locking mechanism of FIG. 1 in the locked position.

As seen in FIGS. 3 and 6, when the rotary actuator 30 rotates the cam 44 such that the lobes 52 do not restrain the balls 40, the balls 40 roll out of the housing grooves 58 and into the voids 54. Since the balls 40 are no longer wedged between the housing grooves 58 and the lock shaft grooves 56, the compressed spring 42 expands to move the lock shaft 38 down and position the locking mechanism 22 in the released position. In the released position, the locking assembly 34 releases the members 24, thereby allowing the members 24 to move to a deployed position.

In the transition from the locked position to the released position, the locking assembly 34, the lock shaft 38, the rotary actuator 30, and the cam 44 move together in a downward motion with respect to reference line 74. For example, as illustrated in FIG. 2 and FIG. 3, the locking assembly 34 and the housing 32 defines a first gap 66 while the housing 32 and the rotary actuator 30 defines a second gap 68. Since the housing 32 is fixed to a rigid surface, such as a chassis 28, when the locking assembly 34, the lock shaft 38, the rotary actuator 30, and the cam 44 move together, the first gap 66 and the second gap 68 change in size. The motion of the locking mechanism 22 results in the first gap 66 being larger when the locking mechanism 22 is in the locked position than when it is in the released position, and the second gap 68 being smaller when the locking mechanism 22 is in the locked position than when it is in the released position.

With respect to the locking mechanism 22, because the motion of the rotary actuator 30 is perpendicular to the external forces applied to flight devices (including shocks and vibrations that occur during handling and operation of flight devices), the risk of outside interference and accidental deployment is reduced. Additionally, the force required to rotate the cam 44 (between about 1 and 3 pounds force) is relatively small compared to the force released by the compressed spring 42 (such as over 100 pounds). Since only a small amount of force is necessary to rotate the actuator while providing a relatively large release force, a small, lightweight rotary actuator can be used even for circumstances that require large spring forces. A small, lightweight rotary actuator reduces the overall weight that is added to a flight vehicle which will conserve fuel.

Figure 7:
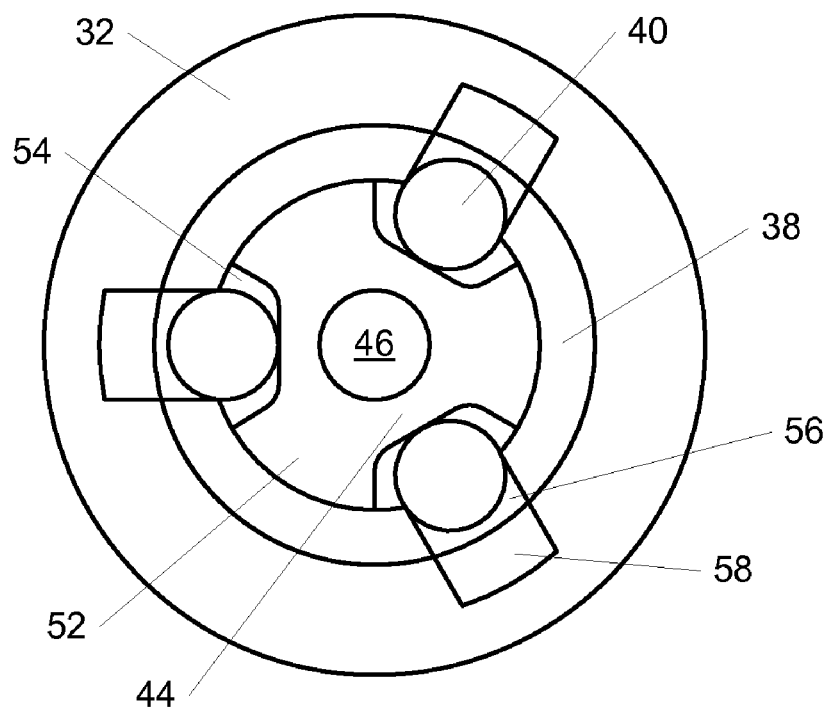
FIG. 7 is top cross-sectional view of the locking mechanism of FIG. 1 in the released position.

While the set of balls 40, housing grooves 58, lock shaft grooves 56, lobes 52, and voids 54 can have a variety of configurations, in one arrangement, FIG. 6 and FIG. 7 show a version of the locking mechanism 22 that has three balls 40, three housing grooves 58, three lock shaft grooves 56, and the cam 44 with three lobes 52 and three voids 54.

As seen in FIG. 6, when the lobes 52 are facing the lock shaft grooves 56 and the housing grooves 58, the balls 40 are unable to move. The biasing member 42 pushes on the lock shaft 38 which places a shear force on the balls 40. The balls, being unable to move, holds lock shaft 38 in place. As seen in FIG. 7, when the cam 44 is rotated so that the voids 54 are facing the lock shaft grooves 56 and the housing grooves 58, the balls 40 are no longer restricted to remaining in the housing grooves 58. The shear force applied by the biasing member 42 on the lock shaft 38 drives the balls 40 towards the center of the locking mechanism 22 and into the voids 54.

As indicated above, the locking mechanism 22 is configured to interact with the members 24 to hold the members 24 in a retracted position and allow the members 24 to release to a deployed position. In one arrangement, the locking assembly 34 of the locking mechanism 22 is configured to hold deployment elements or pins 80 associated with the members 24 to maintain the members 24 in a retracted position. For ease of description, a single pin 80 is shown in FIGS. 2 and 3.

As illustrated in FIG. 2 and FIG. 3, the locking assembly 34 is attached to the top of the lock shaft 38. In this embodiment, the locking assembly 34 includes a head 76 that defines a set of lock slots 60. The lock slots 60 have a first width 62 and a second width 64 where the second width 64 is larger than the first width 62. In this embodiment, the deployment elements or pins 80 fit into the lock slots 60. Depending on whether the locking mechanism 22 is in the locked position or the released position, the set of pins 80 reside either in the portion of the lock slots 60 that has the first width 62, as shown in FIG. 2, or the portion of the lock slots 60 that has the second width 64, as shown in FIG. 3.

In use, when the locking mechanism 22 is disposed in the locked position, as seen in FIG. 2, the locking assembly 34 is at a higher elevation with respect to reference line 74 than when the locking mechanism 22 is in the released position, as seen in FIG. 3. The higher elevation of the locking assembly 34 forces the pins 80 to reside in the portion of the lock slots 60 with the first width 62. Since the portion of the lock slots 60 with the first width 62 is about the width of the pins 80, the pins 80 are restricted in their movement. This restricted movement keeps the retracted members 24 in the retracted position. When the locking mechanism 22 moves to the released position, as seen in FIG. 3, the locking assembly 34 is at a lower elevation with respect to reference line 74. The lower elevation of the locking assembly 34 causes the pins 60 to reside in the portion of the lock slots 60 with the second width 64. Since the portion of the lock slots 60 with the second width 64 is wider than the width of the pins 80, the pins 80 are free to move. This freedom to move releases the members 24 from the retracted position and allows the members to rotate about pivot point 25 to the deployed position.

While various embodiments of the invention have been particularly shown and described, it will be understood by those skilled in the art that various changes in form and details may be made therein without departing from the spirit and scope of the invention as defined by the appended claims.

For example, as indicated above, the locking assembly 34 is connected by the lock shaft 38 running though the length of the housing 32. Such description is by way of example only. In one arrangement, the locking assembly 34 attaches to the lock shaft 38 having the set of flanges 72 which opposes the locking assembly 34. The spring 42 is disposed between the top of housing 32 and the set of flanges 72.

What is claimed is:

1. A locking mechanism, comprising:
    a housing;
    a rotary actuator carried by the housing, the rotary actuator having a shaft and armature disposed around at least a portion of the shaft, the armature configured to rotate the shaft about a longitudinal axis of the shaft;
    a cam carried by the shaft;
    a set of locking balls disposed between the cam and the housing; and
    a locking assembly carried by the housing, the locking assembly being axially positionable between a locked position relative to the housing and a released position relative to the housing;
    the rotary actuator configured to rotate the cam between (i) a first position to maintain the set of balls in a locked state relative to the housing and the cam and to maintain the locking assembly in the locked position and (ii) a second position to position the set of balls to a released state relative to the housing and the cam and to position the locking assembly to the released position;
    wherein the locking assembly comprises a lock shaft portion disposed within the housing and a head portion disposed external to the housing, the head portion defining set of slots constructed and arranged to capture deployment elements, each slot of the set of slots defining a first width slot portion and a second width slot portion, the first width slot portion being smaller than the second width slot portion, wherein the deployment elements are (i) in the first width slot portions of the set of slots when the locking assembly is in the locked position, and (ii) in the second width slot portions of the set of slots when the locking assembly is in the released position.

2. The locking mechanism of claim 1, comprising a biasing member disposed within housing, the rotary actuator being configured to rotate the cam between (i) the first position to maintain the biasing member in a compressed state and (ii) the second position to release the biasing member to an expanded state to position the locking assembly to the released position.

3. The locking mechanism of claim 2, wherein the biasing member comprises a spring that requires at least 100 pounds to compress when the cam is in the first position.

4. The locking mechanism of claim 1, wherein the lock shaft comprises a flange member, the flange member defining a set of lock shaft grooves configured to hold the set of locking balls.

5. The locking mechanism of claim 1, the cam defining a set of lobes and a set of voids alternately disposed between the lobes, the housing defining a set of set of housing grooves, wherein the set of voids align with the set housing grooves when the cam is in the second position.

6. An airborne device comprising:
    an airborne device chassis;
    a member moveable between a retracted position and a deployed position; and
    a locking mechanism connected to the member and configured to position the member from the retracted position to the deployed position, the locking mechanism comprising:
        a housing connected to the airborne device chassis,
            a rotary actuator carried by the housing, the rotary actuator having a shaft and armature disposed around at least a portion of the shaft, the armature configured to rotate the shaft about a longitudinal axis of the shaft,
        a cam carried by the shaft,
        a set of locking balls disposed between the cam and the housing, and
            a locking assembly carried by the housing, the locking assembly being axially positionable between a locked position relative to the housing and a released position relative to the housing,
            the rotary actuator configured to rotate the cam between (i) a first position to maintain the set of balls in a locked state relative to the housing and the cam, to maintain the locking assembly in the locked position, and to maintain the member in the retracted position and (ii) a second position to position the set of balls to a released state relative to the housing and the cam, to position the locking assembly to the released position, and to position the member to the deployed position;
    wherein the housing is rigidly fixed to the airborne device chassis.

7. The airborne device of claim 6, comprising a biasing member disposed within housing, the rotary actuator being configured to rotate the cam between (i) the first position to maintain the biasing member in a compressed state and (ii) the second position to release the biasing member to an expanded state to position the locking assembly to the released position.

8. The airborne device of claim 7, wherein the biasing member comprises a spring that requires at least 100 pounds to compress when the cam is in the first position.

9. The airborne device of claim 6, wherein the locking assembly comprises a lock shaft portion disposed within the housing and a head portion disposed external to the housing.

10. The airborne device of claim 9, wherein the lock shaft comprises a flange member, the flange member defining a set of lock shaft grooves configured to hold the set of locking balls.

11. The airborne device of claim 6, the cam defining a set of lobes and a set of voids alternately disposed between the lobes, the housing defining a set of set of housing grooves, wherein the set of voids align with the set of housing grooves when the cam is in the second position.

12. An airborne device comprising:
    an airborne device chassis;
    a member moveable between a retracted position and a deployed position; and
    a locking mechanism connected to the member and configured to position the member from the retracted position to the deployed position, the locking mechanism comprising:
        a housing connected to the airborne device chassis,
        a rotary actuator carried by the housing, the rotary actuator having a shaft and armature disposed around at least a portion of the shaft, the armature configured to rotate the shaft about a longitudinal axis of the shaft, a cam carried by the shaft, a set of locking balls disposed between the cam and the housing, and a locking assembly carried by the housing, the locking assembly being axially positionable between a locked position relative to the housing and a released position relative to the housing, the rotary actuator configured to rotate the cam between (i) a first position to maintain the set of balls in a locked state relative to the housing and the cam, to maintain the locking assembly in the locked position, and to maintain the member in the retracted position and (ii) a second position to position the set of balls to a released state relative to the housing and the cam, to position the locking assembly to the released position, and to position the member to the deployed position;

wherein the locking assembly comprises a lock shaft portion disposed within the housing and a head portion disposed external to the housing, the head portion defining set of slots constructed and arranged to capture deployment elements, each slot of the set of slots defining a first width slot portion and a second width slot portion, the first width slot portion being smaller than the second width slot portion, wherein the deployment elements are (i) in the first width slot portions of the set of slots when the locking assembly is in the locked position, and (ii) in the second width slot portions of the set of slots when the locking assembly is in the released position.

13. The airborne device of claim 12, wherein the housing is rigidly fixed to the airborne device chassis.

14. The airborne device of claim 12, wherein the locking mechanism holds pins relative to the moveable members.

15. An airborne device comprising:

an airborne device chassis;

a member moveable between a retracted position and a deployed position; and a locking mechanism connected to the member and configured to position the member from the retracted position to the deployed position, the locking mechanism comprising:

a housing connected to the airborne device chassis, a rotary actuator carried by the housing, the rotary actuator having a shaft and armature disposed around at least a portion of the shaft, the armature configured to rotate the shaft about a longitudinal axis of the shaft, a cam carried by the shaft, a set of locking balls disposed between the cam and the housing, and a locking assembly carried by the housing, the locking assembly being axially positionable between a locked position relative to the housing and a released position relative to the housing, the rotary actuator configured to rotate the cam between (i) a first position to maintain the set of balls in a locked state relative to the housing and the cam, to maintain the locking assembly in the locked position, and to maintain the member in the retracted position and (ii) a second position to position the set of balls to a released state relative to the housing and the cam, to position the locking assembly to the released position, and to position the member to the deployed position;

wherein the locking mechanism holds pins relative to the moveable member.

* * * * *